United States Patent
Sato et al.

(10) Patent No.: US 8,498,501 B2
(45) Date of Patent: Jul. 30, 2013

(54) SEMICONDUCTOR OPTICAL MODULATOR AND SEMICONDUCTOR MACH-ZEHNDER OPTICAL MODULATOR

(75) Inventors: Kenji Sato, Tokyo (JP); Tomoaki Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 34 days.

(21) Appl. No.: 13/321,903

(22) PCT Filed: May 12, 2010

(86) PCT No.: PCT/JP2010/058010
§ 371 (c)(1),
(2), (4) Date: Dec. 20, 2011

(87) PCT Pub. No.: WO2010/137458
PCT Pub. Date: Dec. 2, 2010

(65) Prior Publication Data
US 2012/0183249 A1    Jul. 19, 2012

(30) Foreign Application Priority Data
May 27, 2009   (JP) ................................. 2009-128340

(51) Int. Cl.
*G02F 1/035* (2006.01)
*G02F 1/295* (2006.01)

(52) U.S. Cl.
USPC ............... 385/2; 385/4; 257/96; 372/43.01

(58) Field of Classification Search
USPC ............... 385/2, 4, 14; 257/227, E31.063, 257/E33.013, E21.09, 43, 96; 438/47, 91; 372/43.01
See application file for complete search history.

(56) References Cited

U.S. PATENT DOCUMENTS

| | | | |
|---|---|---|---|
| 6,600,842 B2 * | 7/2003 | Yamada | 385/2 |
| 8,148,229 B2 * | 4/2012 | Shiba et al. | 438/380 |
| 8,222,658 B2 * | 7/2012 | Shinagawa et al. | 257/96 |
| 2009/0050933 A1 * | 2/2009 | Shiba et al. | 257/186 |

FOREIGN PATENT DOCUMENTS

| | | |
|---|---|---|
| JP | 2-272785 A | 11/1990 |
| JP | 7-106705 A | 4/1995 |
| JP | 2000066156 A | 3/2000 |
| JP | 4036878 B | 1/2008 |
| JP | 4141451 B | 8/2008 |
| WO | 2004081638 A | 9/2004 |

OTHER PUBLICATIONS

International Search Report for PCT/JP2010/058010 mailed Jun. 22, 2010.

* cited by examiner

*Primary Examiner* — Akm Enayet Ullah

(57) ABSTRACT

Provided are a semiconductor optical modulator and a semiconductor Mach-Zehnder optical modulator of high efficiency and high reliability.
The semiconductor optical modulator 10 of the present invention includes a substrate 11; a first n-type cladding layer 12; a semiconductor optical modulation layer 13; a p-type cladding layer 14; a second n-type cladding layer 15; a passivation film 19; and an electric field-relaxing layer 16, wherein the first n-type cladding layer 12, the semiconductor optical modulation layer 13, the p-type cladding layer 14, and the second n-type cladding layer 15 are laminated on the substrate 11 in this order to form a waveguide structure, the passivation film 19 is arranged at the side surfaces of the waveguide structure, the electric field-relaxing layer 16 is interposed between the p-type cladding layer 14 and the second n-type cladding layer 15, and an impurity concentration of the electric field-relaxing layer 16 is lower than that of the p-type cladding layer 14 and that of the second n-type cladding layer 15.

11 Claims, 12 Drawing Sheets

SEMICONDUCTOR OPTICAL MODULATOR AND SEMICONDUCTOR MACH-ZEHNDER OPTICAL MODULATOR

TECHNICAL FIELD

The present invention relates to a semiconductor optical modulator and a semiconductor Mach-Zehnder optical modulator.

BACKGROUND ART

Along with the rapid popularization of the internet in late years, there is a demand for further increase in the capacity of a communication traffic. Examples of the method of increasing the capacity of the communication traffic include the method of multiplexing the wavelength of signal light and increasing the number of channels transmitting an optical fiber at the same time (wavelength division multiplexing (WDM)) and the method of increasing the transmission quantity (transmission speed) for each channel per unit time. An example of the method of increasing the transmission speed includes the method of modulating the signal light at high speed.

Examples of the method of modulating the signal light at high speed include the method of directly modulating the signal light from a semiconductor laser, which is used as a light source and the method of indirectly (externally) modulating the signal light from the semiconductor laser. In the method of directly modulating the signal light, output light (signal light) from the semiconductor laser is directly modulated by modulating the drive current to the semiconductor laser. The method of directly modulating the signal light is used widely because the device configuration can be simplified. However, the modulation speed of the signal light by the method of directly modulating the signal light is limited by the response speed of the semiconductor laser. Therefore, the method of directly modulating the signal light is not suitable for modulating the signal light at higher speed. In contrast, in the method of indirectly (externally) modulating the signal light, in the condition where the semiconductor laser is operated by the direct current and the signal light intensity is kept constant, the signal light is modulated by an external modulator, which is another optical device. An example of the external modulator includes a Mach-Zehnder optical modulator (LN modulator) using a LiNbO$_3$ crystal as a material. Optical transmission systems such as 10 Gb/s and 40 Gb/s using this LN modulator are in practical use. Further, since the LN modulator has a modulation characteristic independent from a wavelength, it is suitable for the WDM system.

However, the LN modulator has problems that the driving voltage thereof is high (for example, 5V or more) and the size thereof is large (for example, 10 cm or more). Hence, semiconductor optical modulators capable of reducing the voltage and size have been developed. Such semiconductor optical modulators use multiple quantum wells as core layers and utilize the refractive index change by voltage application by the quantum confined Stark effect (QCSE), for example. The semiconductor optical modulators use, for example, indium phosphide (InP)-based materials and gallium arsenide (GaAs)-based materials as materials for semiconductors. The Mach-Zehnder optical modulator (semiconductor MZM) using such a semiconductor optical modulator achieves the reduction in driving voltage (for example, 2 V) and the reduction in size (for example, about 2 mm), and therefore it has been in practical use in recent years. Further, the semiconductor optical modulator can be integrated, for example, with a semiconductor laser, other optical devices such as an optical amplifier, an electronic circuit, and the like.

As the semiconductor optical modulator, for example, a semiconductor optical modulator having a p-i-n-type layer structure as shown in FIG. 12 is used commonly (for example, see Patent Document 1). In a semiconductor optical modulator 120, formed is a Highmesa (deep ridge) waveguide structure in which an n-type semiconductor layer 122, an optical modulation layer 123, and a p-type semiconductor layer 124 are laminated on a substrate 121 in this order. A passivation (which works as insulation protection) film 129 is arranged at the side surfaces of the Highmesa waveguide structure. The arrow B indicates the boundary between the Highmesa waveguide structure and the passivation film 129. FIG. 14A shows an example of the band diagram of the semiconductor optical modulator 120. In a band diagram 120a, band diagrams 124a, 123a, and 122a are band diagrams respectively corresponding to the p-type semiconductor layer 124, the optical modulation layer 123, and the n-type semiconductor layer 122 of the semiconductor optical modulator 120 shown in FIG. 12. In the semiconductor optical modulator 120, the optical modulation layer 123 is interposed between the n-type semiconductor layer 122 and the p-type semiconductor layer 124. Signal light is guided into the optical modulation layer 123, and the signal light guided undergoes a refractive index modulation by a voltage applied to the optical modulation layer 123. The optical modulation layer 123 uses a multiple quantum well as a core layer and generally is an undoped layer (i layer). Since the undoped layer (i layer) is present between the n-type semiconductor layer 122 and the p-type semiconductor layer 124, an electric field can be applied to the optical modulation layer 123 efficiently, and thereby the QCSE can be used efficiently. In the semiconductor optical modulator 120, for example, the impurity concentration of each of the n-type semiconductor layer 122 and the p-type semiconductor layer 124 is $10^{17}$ cm$^{-3}$ or more and the impurity concentration of the undoped layer (i layer) is $10^{16}$ cm$^{-3}$ or lower.

A semiconductor MZM using the semiconductor optical modulator having the p-i-n-type layer structure has a problem that the optical transmission loss in the p-type semiconductor layer is large as compared to the case of using the LN modulator. The optical transmission loss is a problem that cannot be ignored because there is a case of using the semiconductor MZM having a length of a millimeter order in the traveling direction of the signal light.

Hence, a semiconductor optical modulator having the n-i-n-type layer structure, which does not contain a p-type semiconductor layer and a semiconductor optical modulator having the n-SI-i-n-type layer structure, which does not contain a p-type semiconductor layer have been proposed (for example, see Patent Document 2). Here, the "SI layer" refers to a semi-insulating semiconductor layer (a semi-insulating layer), and the impurity concentration of the SI layer is negligibly small. These structures make it possible to reduce the optical transmission loss. However, in these semiconductor optical modulators, an electric field applied to the undoped layer (i layer) is small as compared to the semiconductor optical modulator having the p-i-n-type layer structure.

Hence, a semiconductor optical modulator as shown in FIGS. 13A and B has been proposed (for example, see Patent Document 3). FIG. 13A is a perspective view of the semiconductor optical modulator, and FIG. 13B is a cross-sectional view taken along the line I-I of FIG. 13A. In FIGS. 13A and B, identical parts are indicated with identical numerals and symbols. As shown in FIGS. 13A and B, in a semiconductor optical modulator 130, formed is a Highmesa waveguide structure in which a first n-InP cladding layer 132, an optical modulation layer (i layer) 133, an SI cladding layer 137, and a second n-InP cladding layer 135 are laminated on a substrate 131 in this order. In the semiconductor optical modulator 130, a part of the second n-InP cladding layer 135, which is an interval having a certain length in the traveling direction of the signal light, serves as a p-type semiconductor region 138. A passivation film 139 is arranged at the side surfaces of the Highmesa waveguide structure. The arrow C indicates the boundary between the Highmesa waveguide structure and the passivation film 139. In FIG. 13A, illustration of the passivation film 139 is omitted.

FIG. 14B shows an example of the band diagram of the semiconductor optical modulator 130. In a band diagram 130a, band diagrams 135a, 138a, 137a, 133a, and 132a are band diagrams respectively corresponding to the second n-InP cladding layer 135, the p-type semiconductor region 138, the SI cladding layer 137, the optical modulation layer (i layer) 133, and the first n-InP cladding layer 132 of the semiconductor optical modulator 130 shown in FIG. 13. In the semiconductor optical modulator 130, by suitably setting the thickness of the p-type semiconductor region 138, the optical transmission loss can be reduced, and an electric field can be applied to the optical modulation layer (i layer) 133 sufficiently.

RELATED ART DOCUMENT

Patent Document

Patent Document 1: JP H7(1995)-106705 A
Patent Document 2: Japanese Patent No. 4036878
Patent Document 3: Japanese Patent No. 4141451

SUMMARY OF INVENTION

Problem to be Solved by the Invention

FIG. 14C is a view comparing the band diagram 120a of the semiconductor optical modulator 120 and the band diagram 130a of the semiconductor optical modulator 130. In FIG. 14C, identical parts to those shown in FIGS. 14A and B are indicated with identical numerals and symbols. In FIG. 14C, the band diagram 120a is indicated by a dashed line and the band diagram 130a is indicated by a solid line. Further, the position of the band diagram 122a is aligned with the position of the band diagram 132a, the position of the band diagram 123a is aligned with the position of the band diagram 133a, and the position of the band diagram 124a is aligned with the positions of the band diagrams 135a, 138a, and 137a. As described above, in the semiconductor optical modulator 130, the thickness of the p-type semiconductor region 138 is set relatively small (for example, 0.05 to 0.2 μm) for the purpose of the reduction in the optical transmission loss. Therefore, for example, even when the impurity concentration of the p-type semiconductor region 138 is set high (for example, $1\times10^{17}$ to $1\times10^{18}$ cm$^{-3}$), as shown in FIG. 14C, as compared to the p-type semiconductor layer 124, the amount of increase in potential by the p-type semiconductor region 138 and the SI cladding layer 137 decreases. As a result, the electric field applied to the optical modulation layer (i layer) 133 is relatively decreased. Therefore, in the semiconductor optical modulator 130, there is a need for increasing the voltage required for modulation.

FIG. 15 shows the electric field intensity obtained by differentiation of potential in the band diagrams 120a and 130a. In FIG. 15, the layer direction coordinate X1 indicates the layer direction coordinate of the semiconductor optical modulator 120, and the layer direction coordinate X2 indicates the layer direction coordinate of the semiconductor optical modulator 130. In FIG. 15, the graph showing the electric field of the semiconductor optical modulator 120 is indicated by a dashed line, and the graph showing the electric field of the semiconductor optical modulator 130 is indicated by a solid line. In FIG. 15, identical parts to those shown in FIGS. 12, 13A, and 13B are indicated with identical numerals and symbols. The graph indicated by 151a is the graph showing the electric field in the condition where the impurity concentration of the p-type semiconductor region 138 of the semiconductor optical modulator 130 is $1\times10^{18}$ cm$^{-3}$, and the graph indicated by 151b is the graph showing the electric field in the condition where the impurity concentration of the p-type semiconductor region 138 of the semiconductor optical modulator 130 is $1\times10^{17}$ cm$^{-3}$. As shown in FIG. 15, the electric field 152a applied to the optical modulation layer (i layer) 133 of the semiconductor optical modulator 130 is smaller than the electric field 152b applied to the optical modulation layer (undoped layer (i layer)) 123 of the semiconductor optical modulator 120.

Further, in the semiconductor optical modulator 130, due to the steep slope of the potential, a peak electric field 153a or 153b is applied to the junction region of the second n-InP cladding layer 135 and the p-type semiconductor region 138. In such a case, at the boundary (for example, boundary indicated by the arrow C in FIG. 13) between the waveguide structure and the passivation film, a particularly high electric field as compared to the center part of the semiconductor layer is applied. For example, by the setting of the impurity concentration or the like of the p-type semiconductor region 138, as shown in FIG. 15, the peak electric field reaches, for example, 200 to 400 kV/cm. Depending on the type of the passivation film, there is a possibility that breakdown occurs at 500 to 600 kV/cm, for example. Therefore, by further application of the electric field or the like in this state, there is a possibility that the electric field exudes greatly and the breakdown occurs in the passivation film. The possibility of the occurrence of the breakdown considerably decreases the reliability of the apparatus, for example.

Hence, the present invention is intended to provide a semiconductor optical modulator and a semiconductor Mach-Zehnder optical modulator of high efficiency and high reliability.

Means for Solving Problem

In order to achieve the aforementioned object, the semiconductor optical modulator of the present invention comprises: a substrate; a first n-type cladding layer; a semiconductor optical modulation layer; a p-type cladding layer; a second n-type cladding layer; a passivation film; and an electric field-relaxing layer, wherein
the first n-type cladding layer, the semiconductor optical modulation layer, the p-type cladding layer, and the second n-type cladding layer are laminated on the substrate in this order to form a waveguide structure,
the passivation film is arranged at side surfaces of the waveguide structure,
the electric field-relaxing layer is interposed between the p-type cladding layer and the second n-type cladding layer, and
an impurity concentration of the electric field-relaxing layer is lower than that of the p-type cladding layer and that of the second n-type cladding layer.

Further, the semiconductor Mach-Zehnder optical modulator of the present invention comprises: a substrate; a light branching unit branching input light; a first semiconductor optical modulator modulating light branched; a second semiconductor optical modulator modulating light branched; and a light combining unit combining light modulated by the first semiconductor optical modulator and the second semiconductor optical modulator, wherein the light branching unit, the first semiconductor optical modulator, the second semiconductor optical modulator, and the light combining unit are provided on the substrate, and at least one of the first semiconductor optical modulator and the second semiconductor optical modulator is the semiconductor optical modulator of the present invention described above.

Effects of the Invention

The semiconductor optical modulator and the semiconductor Mach-Zehnder optical modulator of the present invention achieve high efficiency and high reliability.

DESCRIPTION OF EMBODIMENTS

Hereinafter, the semiconductor optical modulator and the semiconductor Mach-Zehnder optical modulator of the present invention will be described specifically. However, the present invention is not limited to the following Embodiments Embodiment 1

Figure 1:
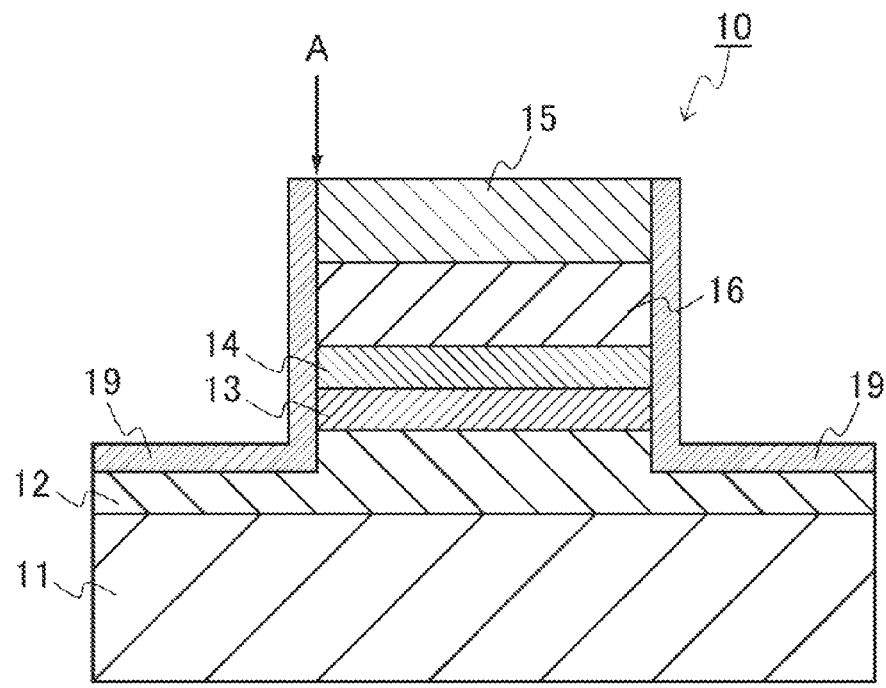
FIG. 1 is a cross sectional view showing an example of the configuration of the semiconductor optical modulator of the present invention in Embodiment 1.

FIG. 1 shows an example of the configuration of the semiconductor optical modulator of this Embodiment. As shown in FIG. 1, in a semiconductor optical modulator 10, formed is a Highmesa waveguide structure in which a first n-InP cladding layer 12, an undoped layer (i layer) 13 having a multiple quantum well structure, a p-InP cladding layer 14, and a second n-InP cladding layer 15 are laminated on an InP substrate 11 in this order. An electric field-relaxing layer 16 is interposed between the p-InP cladding layer 14 and the second n-InP cladding layer 15. The impurity concentration of the electric field-relaxing layer 16 is set lower than the impurity concentration of the p-InP cladding layer 14 and the impurity concentration of the second n-InP cladding layer 15. A passivation film 19 is provided on surfaces (right and left sides in FIG. 1) of the waveguide structure. The arrow A indicates the boundary between the Highmesa waveguide structure and the passivation film 19. In the semiconductor optical modulator of this Embodiment, a Highmesa waveguide structure is employed as the waveguide structure; InP is employed as the materials of the substrate, the first n-type cladding layer, the p-type cladding layer, and the second n-type cladding layer; and an undoped layer (i layer) having the multiple quantum well structure is employed as the semiconductor optical modulation layer. In order to reduce the electric resistance at the junction region with an electrode, for example, an n-type InGaAs contact layer is provided above the second n-InP cladding layer 15. However, illustration thereof is omitted in the semiconductor optical modulator 10 of this Embodiment.

Figure 2:
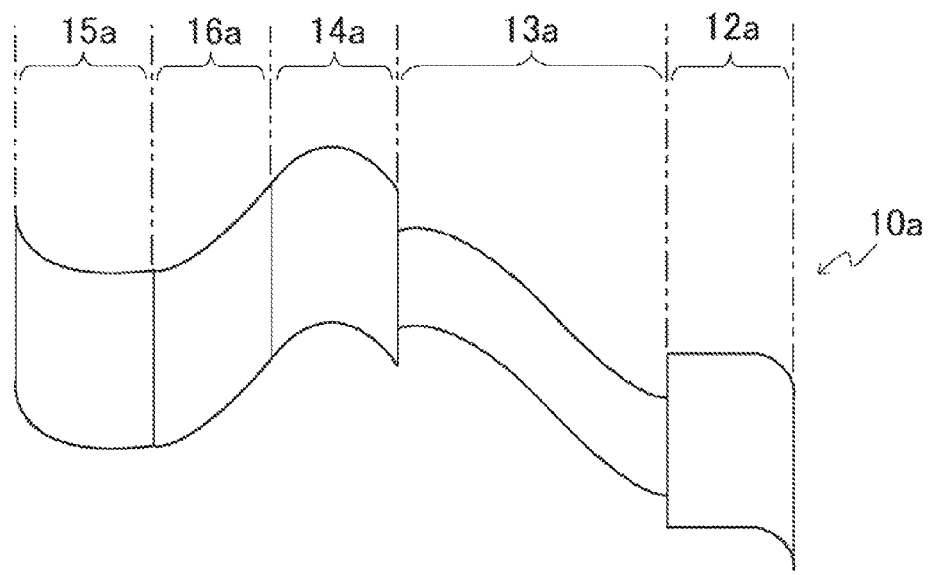
FIG. 2 shows an example of the band diagram of the semiconductor optical modulator of the present invention in Embodiment 1.

FIG. 2 shows an example of the band diagram of the semiconductor optical modulator 10 of this Embodiment in the condition where the impurity concentration of the p-InP cladding layer 14 is about $2 \times 10^{17}$ cm$^{-3}$, the impurity concentration of the second n-InP cladding layer 15 is about $5\times10^{17}$ cm$^{-3}$, and the impurity concentration of the electric field-relaxing layer 16 is about $2\times10^{16}$ cm$^{-3}$. In this band diagram 10a, band diagrams 15a, 16a, 14a, 13a, and 12a are band grams respectively corresponding to the second n-InP cladding layer 15, the electric field-relaxing layer 16, the p-InP cladding layer 14, the undoped layer (i layer) 13, and the first n-InP cladding layer 12 shown in FIG. 1.

Figure 3:
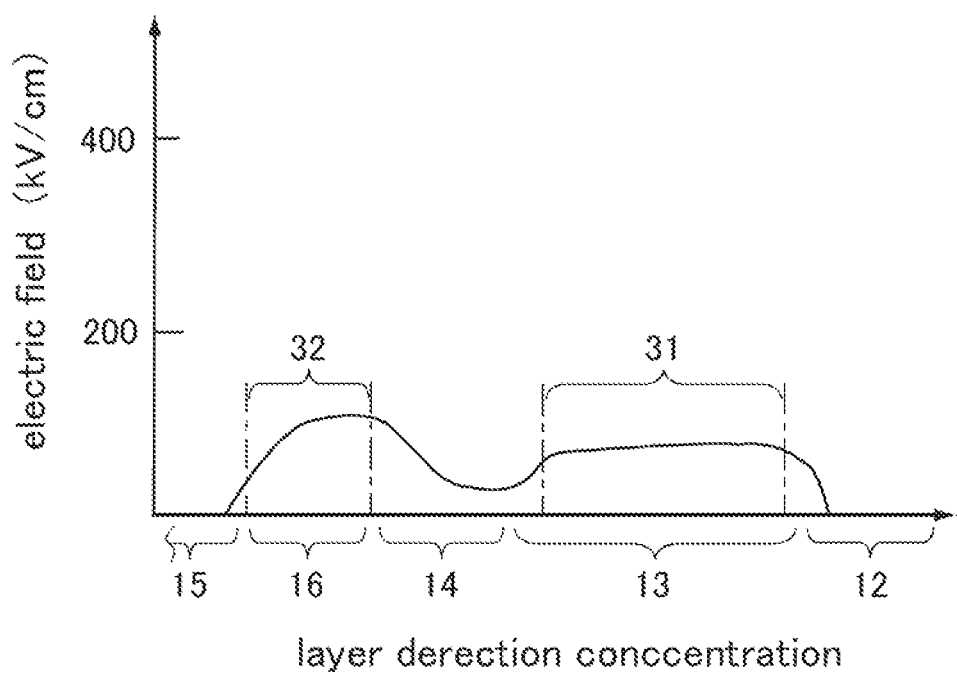
FIG. 3 is a graph showing an example of the relationship between the layer direction coordinate and the electric field of the semiconductor optical modulator of the present invention in Embodiment 1.

FIG. 3 shows the electric field intensity obtained by differentiation of potential in the band diagram 10a. In FIG. 3, identical parts to those shown in FIG. 1 are indicated with identical numerals and symbols. As shown in FIG. 3, the use of the electric field-relaxing layer 16 allows an electric field 32 applied between the p-InP cladding layer 14 and the second n-InP cladding layer 15 (the electric field-relaxing layer 16) to be reduced to about 100 kV/cm. Thereby, particularly, the electric field applied to the boundary between the Highmesa waveguide structure and the passivation film 19 indicated by the arrow A in FIG. 1 can be reduced. As a result, breakdown of the passivation film 19 can be prevented, and the semiconductor optical modulator of this Embodiment achieves high reliability. Further, as described above, since the electric field applied can be reduced, a large voltage can be applied. As a result, an electric field 31 applied to the undoped layer (i layer) 13 can be increased. Moreover, since the amount of the light that is present in the p-InP cladding layer (standardized optical confinement ratio) can be reduced, the optical transmission loss can be reduced. From these reasons, the semiconductor optical modulator of this Embodiment achieves high efficiency.

The semiconductor optical modulator of this Embodiment employs a Highmesa waveguide structure as the waveguide structure. However, the present invention is not limited thereto. Besides the Highmesa waveguide structure, structures capable of guiding signal light such as a ridge waveguide structure, a Highmesa ridge waveguide structure, and a semiconductor embedded waveguide can be employed as the waveguide structure.

As described above, the impurity concentration of the electric field-relaxing layer is lower than the impurity concentration of the p-InP cladding layer and the impurity concentration of the second n-InP cladding layer. The impurity concentration of the electric field-relaxing layer is preferably as low as possible within the feasible range from the viewpoint of improvement in the effect as an electric field-relaxing layer. The impurity concentration of the electric field-relaxing layer is, for example, in the range from about $1\times10^{15}$ to about $2\times10^{17}$ cm$^{-3}$, preferably in the range from about $1\times10^{15}$ to about $1\times10^{17}$ cm$^{-3}$, and more preferably in the range from about $1\times10^{15}$ to about $5\times10^{16}$ cm$^{-3}$. For example, the electric field-relaxing layer can be either n-type or p-type. The semiconductor optical modulator of this Embodiment employs a single layer as the electric field-relaxing layer. However, the present invention is not limited thereto, and a multilayer can be employed as the electric field-relaxing layer. As the impurities, conventionally known impurities can be employed. Examples thereof include sulfur, silicon, and tin for the first n-InP cladding layer and the second n-InP cladding layer; and zinc, beryllium, and cadmium for the p-InP cladding layer.

The semiconductor optical modulator of this Embodiment employs InP as the materials of the substrate, the first n-type cladding layer, the p-type cladding layer, and the second n-type cladding layer. However, the present invention is not limited thereto. Besides InP, examples of the material include GaAs, InGaAsP, InAlAs, and GaAlAs.

As described above, the condition of the impurity concentration of the p-InP cladding layer is satisfied as long as it is higher than the impurity concentration of the electric field-relaxing layer. The impurity concentration of the p-InP cladding layer is, for example, in the range from about $2\times10^{17}$ to about $5\times10^{19}$ cm$^{-3}$, preferably in the range from about $5\times10^{17}$ to about $5\times10^{18}$ cm$^{-3}$, and more preferably in the range from about $5\times10^{17}$ to about $1\times10^{18}$ cm$^{-3}$. The same applies to the case in which the p-type cladding layer is made of a material other than InP. The thickness of the p-InP cladding layer is preferably as small as possible within a range in which the advantages of the present invention are not impaired, although it is not particularly limited. The reduction of the thickness of the p-InP cladding layer makes it possible to further reduce the optical transmission loss, for example. The thickness of the p-InP cladding layer is, for example, in the range from about 0.1 to about 0.5 μm, preferably in the range from about 0.15 to about 0.4 μm, and more preferably in the range from about 0.2 to about 0.3 μm. The same applies to the case in which the p-type cladding layer is made of a material other than InP.

As described above, the condition of the impurity concentration of the second n-InP cladding layer is satisfied as long as it is higher than the impurity concentration of the electric field-relaxing layer. The impurity concentration of the second n-InP cladding layer is, for example, in the range from about $5\times10^{17}$ to about $5\times10^{19}$ cm$^{-3}$, preferably in the range from about $1\times10^{18}$ to about $2\times10^{19}$ cm$^{-3}$, and more preferably in the range from about $2\times10^{18}$ to about $1\times10^{19}$ cm$^{-3}$. The same applies to the case in which the second n-type cladding layer is made of a material other than InP. The thickness of the second n-InP cladding layer is not particularly limited. The same applies to the case in which the second n-type cladding layer is made of a material other than InP.

Examples of the material of the undoped layer (i layer) include InGaAsP, InGaAlAs, InAlAs, GaAlAs, GaTnNAs, and InGaAlAsP. The impurity concentration of the undoped layer (i layer) is, for example, lower than about $1\times10^{17}$ cm$^{-3}$. The semiconductor optical modulator of this Embodiment employs an undoped layer (i layer) having the multiple quantum well structure as the semiconductor optical modulation layer. However, the present invention is not limited thereto. In the case where the semiconductor optical modulator of the present invention is used as a phase modulator of a semiconductor Mach-Zehnder optical modulator, for example, the condition of the semiconductor optical modulator is satisfied as long as the bandgap, the number of quantum well layers, the quantum well width, and the like of the optical modulation layer are set so that it can be operated as a phase modulator. The active layer (optical modulation layer) in a phase modulation region preferably has a bandgap not causing an amplification or a light loss at the wavelength of the signal light.

Various conventionally known materials can be used as the material of the passivation film as long as they have insulation properties, for example. Examples of the material of the passivation film include silicon dioxide (SiO2), silicon nitride (SiN), and silicon oxynitride (SiON).

The semiconductor optical modulator of this Embodiment can be produced, for example, as follows. That is, first, a first n-InP cladding layer, an undoped layer (i layer) having the multiple quantum well structure, a p-InP cladding layer, an electric field-relaxing layer, and a second n-InP cladding layer are formed on the whole surface of an InP substrate at the one side from the bottom in this order by a crystal growth technique such as the metal-organic vapor phase epitaxy (MOVPE) method. The electric field-relaxing layer is doped at an impurity concentration lower than the impurity concentrations of the p-InP cladding layer and the second n-InP cladding layer, between which the electric field-relaxing layer is interposed. The impurity concentration of each layer can be set by a conventionally known method.

Next, on the InP substrate, for forming the waveguide structure containing the undoped layer (i layer), unnecessary InP layers are removed by a semiconductor etching technique to make a Highmesa waveguide structure in which etching is applied to layers from the top to the layer under the undoped layer (i layer). Subsequently, electrodes are formed on the back surface of the InP substrate and on a contact layer provided above the second n-InP cladding layer. Then, a passivation film such as $SiO_2$, SiN, or the like is provided on the upper part of the whole. An opening is provided on the passivation film at the part corresponding to the region where a semiconductor optical modulator is to be formed, and a semiconductor optical modulator is formed by depositing a metal film in the opening. In this manner, the semiconductor optical modulator of this Embodiment can be produced. However, the method of producing the semiconductor optical modulator of this Embodiment is not limited to this example.

Figure 4:
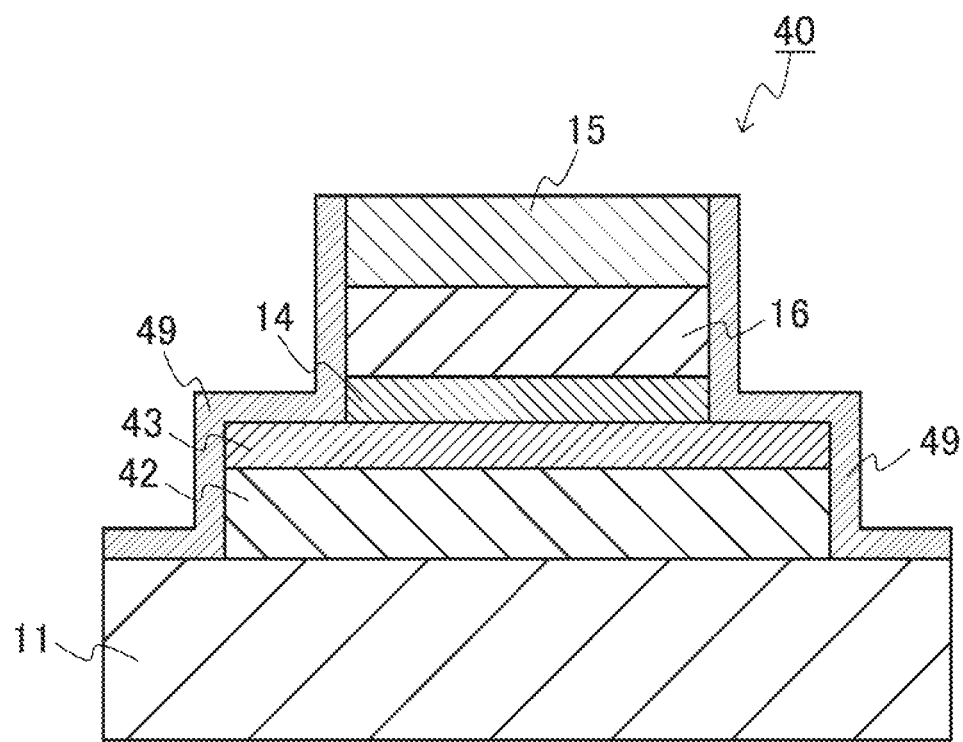
FIG. 4 is a cross sectional view showing another example of the configuration of the semiconductor optical modulator of the present invention in Embodiment 1.

In the semiconductor optical modulator of this Embodiment, for example, a ridge waveguide structure may be employed as the waveguide structure. FIG. 4 shows an example of the configuration of the semiconductor optical modulator of this Embodiment. In FIG. 4, identical parts to those shown in FIG. 1 are indicated with identical numerals and symbols. As shown in FIG. 4, in a semiconductor optical modulator 40, formed is a ridge waveguide structure in which, a first n-InP cladding layer 42, an undoped layer (i layer) 43, a p-InP cladding layer 14, and a second n-InP cladding layer 15 are laminated on an InP substrate 11 in this order. A passivation film 49 is arranged at the side surfaces (right and left sides in FIG. 4) of the waveguide structure. Except for these, the configuration of the semiconductor optical modulator 40 is the same as that of the semiconductor optical modulator 10. With such a configuration, effects similar to those achieved by the semiconductor optical modulator 10 can be achieved.

Embodiment 2

Figure 5A:
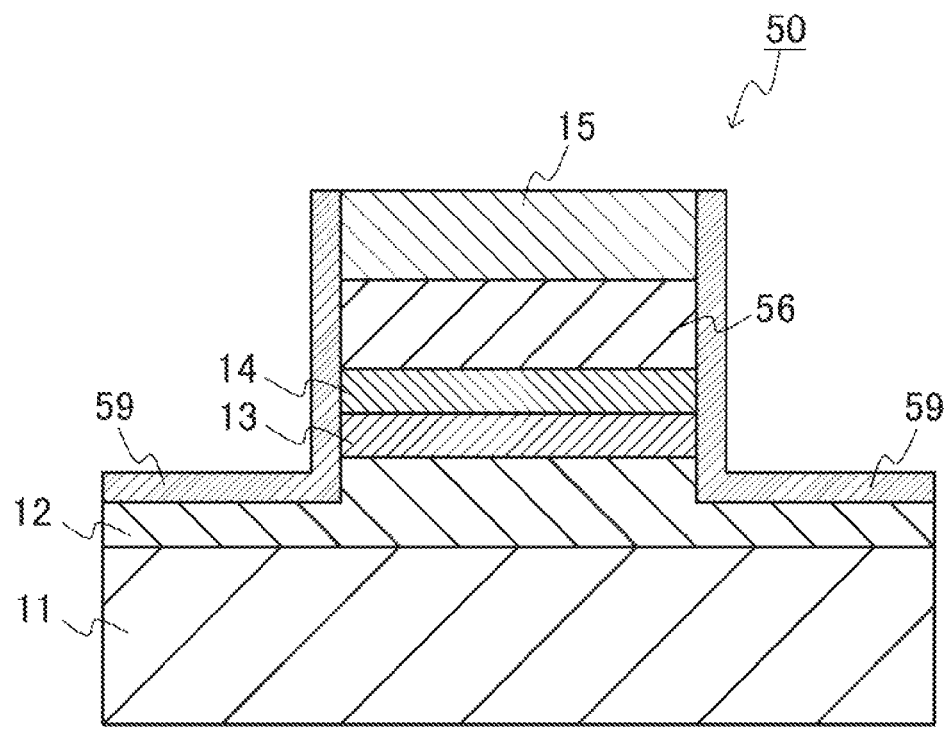
FIG. 5A is a cross sectional view showing an example of the configuration of the semiconductor optical modulator of the present invention in Embodiment 2.

FIG. 5A shows an example of the configuration of the semiconductor optical modulator of this Embodiment. In FIG. 5A, identical pans to those shown in FIG. 1 are indicated with identical numerals and symbols. As shown in FIG. 5A, in a semiconductor optical modulator 50, formed is a Highmesa waveguide structure in which a first n-InP cladding layer 12, an undoped layer (i layer) 13, a p-InP cladding layer 14, and a second n-InP cladding layer 15 are laminated on an InP substrate 11 in this order. An electric field-relaxing layer 56 is interposed between the p-InP cladding layer 14 and the second n-InP cladding layer 15. The electric field-relaxing layer 56 is an n-InP cladding layer ($n^-$-InP cladding layer) having an impurity concentration lower than that of the second n-InP cladding layer 15. The impurity concentration of the $n^-$-InP cladding layer 56 is set lower than that of the p-InP cladding layer 14. A passivation film 59 is arranged at the side surfaces (right and left sides in FIG. 5A) of the waveguide structure. Except for these, the configuration of the semiconductor optical modulator 50 is the same as the configurations of the semiconductor optical modulators of Embodiment 1.

Figure 5B:
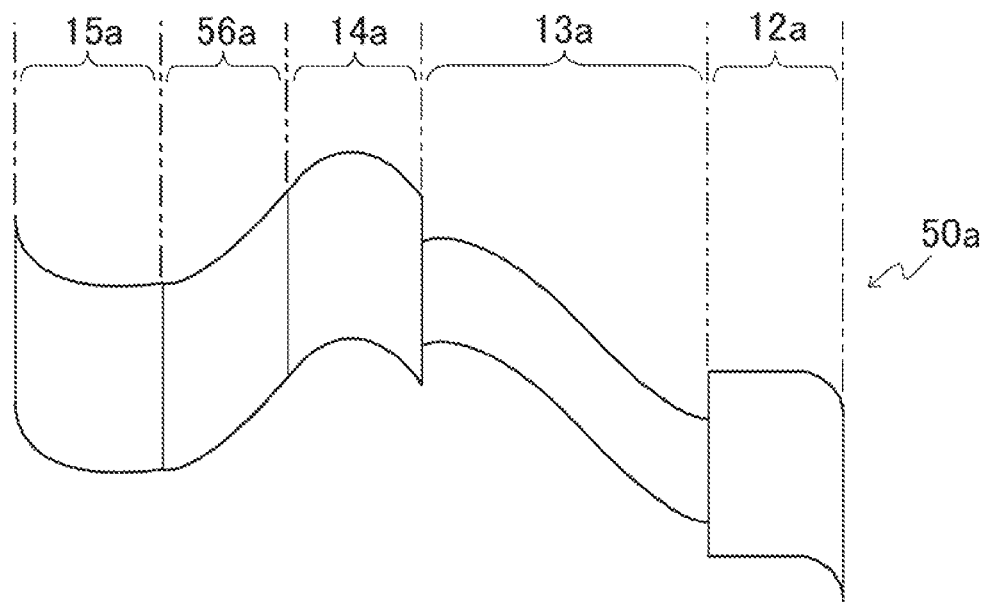
FIG. 5B shows an example of the band diagram of the semiconductor optical modulator of the present invention in Embodiment 2.

FIG. 5B shows an example of the band diagram of the semiconductor optical modulator 50 of this Embodiment in the condition where the impurity concentration of the p-InP cladding layer 14 is about $1\times10^{18}$ cm$^{-3}$, the impurity concentration of the second n-InP cladding layer 15 is about $5\times10^{18}$ cm$^{-3}$, and the impurity concentration of the $n^-$-InP cladding layer 56 is about $2\times10^{17}$ cm$^{-3}$. In this band diagram 50a, band diagrams 15a, 56a, 14a, 13a, and 12a are band diagrams respectively corresponding to the second n-InP cladding layer 15, the $n^-$-InP cladding layer 56, the p-InP cladding layer 14, the undoped layer (i layer) 13, and the first n-InP cladding layer 12 shown in FIG. 5A. In addition to the effects achieved by the semiconductor optical modulators of Embodiment 1, the semiconductor optical modulator of this Embodiment can reduce the element resistance because the impurity concentration of the second n-InP cladding layer can be set high.

The impurity concentration of the $n^-$-InP cladding layer is, for example, in the range from about $1\times10^{17}$ to about $2\times10^{17}$ cm$^{-3}$. Here, in this semiconductor optical modulator, the impurity concentration of the second n-InP cladding layer is, for example, in the range from about $5\times10^{18}$ to about $5\times10^{19}$ cm$^{-3}$. However, this semiconductor optical modulator is not limited to this example.

The semiconductor optical modulator of this Embodiment is produced in the same manner as the semiconductor optical modulators of Embodiment 1 except that the impurity concentrations of the p-InP cladding layer, the $n^-$-InP cladding layer, and the second n-InP cladding layer are set at the predetermined concentrations in lamination of each layer to the InP substrate by the MOVPE method, for example.

Figure 6A:
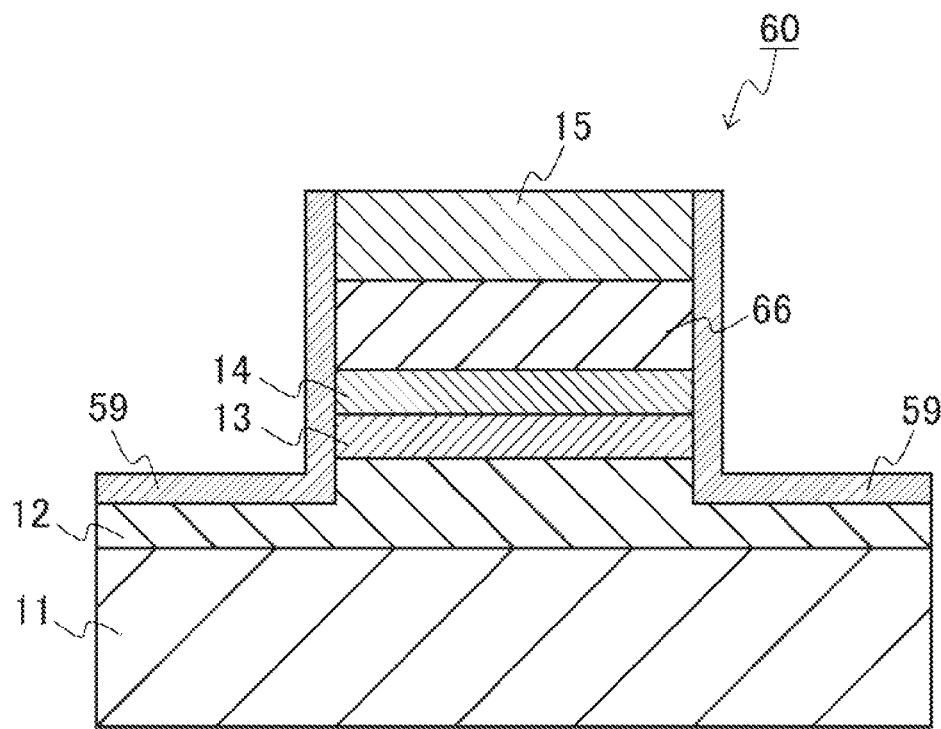
FIG. 6A is a cross sectional view showing another example of the configuration of the semiconductor optical modulator of the present invention in Embodiment 2.

In the semiconductor optical modulator of this Embodiment, for example, the electric field-relaxing layer may be a p-InP cladding layer having an impurity concentration lower than that of the p-InP cladding layer. FIG. 6A shows an example of the configuration of the semiconductor optical modulator of this Embodiment. In FIG. 6A, identical parts to those shown in FIG. 5A are indicated with identical numerals and symbols. As shown in FIG. 6A, in a semiconductor optical modulator 60, an electric field-relaxing layer 66 is interposed between the p-InP cladding layer 14 and the second n-InP cladding layer 15. The electric field-relaxing layer 66 is a p-InP cladding layer ($p^-$-InP cladding layer) having an impurity concentration lower than that of the p-InP cladding layer 14. The impurity concentration of the $p^-$-InP cladding layer 66 is set lower than that of the second n-InP cladding layer 15. Except for these, the configuration of the semiconductor optical modulator 60 is the same as that of the semiconductor optical modulator 50.

Figure 6B:
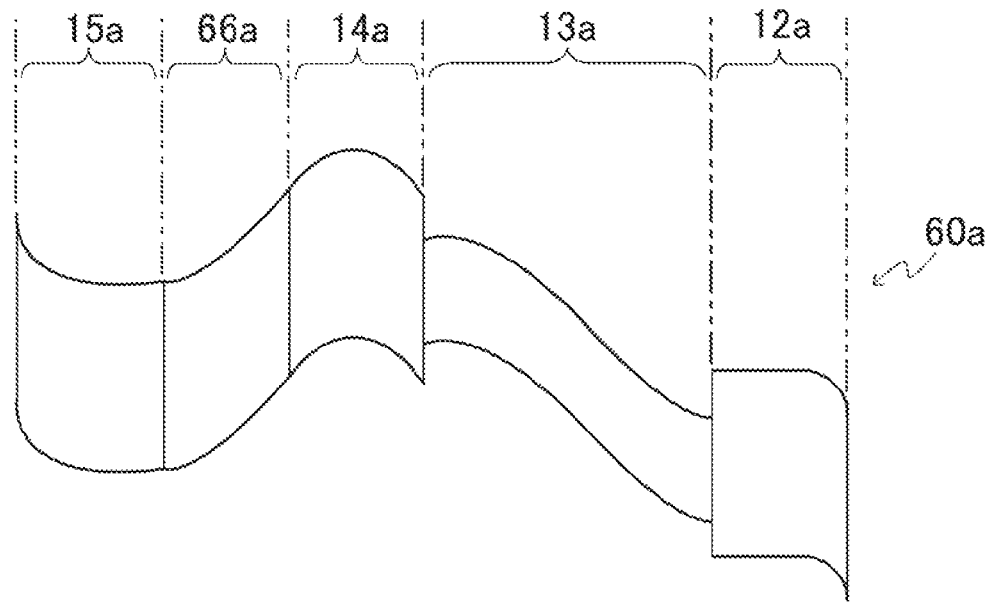
FIG. 6B shows another example of the band diagram of the semiconductor optical modulator of the present invention in Embodiment 2.

FIG. 6B shows an example of the band diagram of the semiconductor optical modulator 60 of this Embodiment in the condition where the impurity concentration of the p-InP cladding layer 14 is about $2\times10^{18}$ cm$^{-3}$, the impurity concentration of the second n-InP cladding layer 15 is about $5\times10^{18}$ cm$^{-3}$, and the impurity concentration of the $p^-$-InP cladding layer 66 is about $2\times10^{17}$ cm$^{-3}$. In this band diagram 60a, band diagrams 15a, 66a, 14a, 13a, and 12a are band diagrams respectively corresponding to the second n-InP cladding layer 15, the $p^-$-InP cladding layer 66, the p-InP cladding layer 14, the undoped layer (i layer) 13, and the first n-InP cladding layer 12 shown in FIG. 6A. In addition to the effects achieved by the semiconductor optical modulators of Embodiment 1, since the impurity concentration of the p-InP cladding layer can be set high, the electric field applied to the optical modulation layer (undoped layer (i layer)) can be increased. As a result, the modulation efficiency of the semiconductor optical modulator 60 can be increased.

The impurity concentration of the $p^-$-InP cladding layer is, for example, in the range from about $1\times10^{17}$ to about $2\times10^{17}$ cm$^{-3}$. Here, in this semiconductor optical modulator, the impurity concentration of the p-InP cladding layer is, for example, in the range from about $5\times10^{18}$ to about $5\times10^{19}$ cm$^{-3}$. However, this semiconductor optical modulator is not limited to this example.

Figure 7:
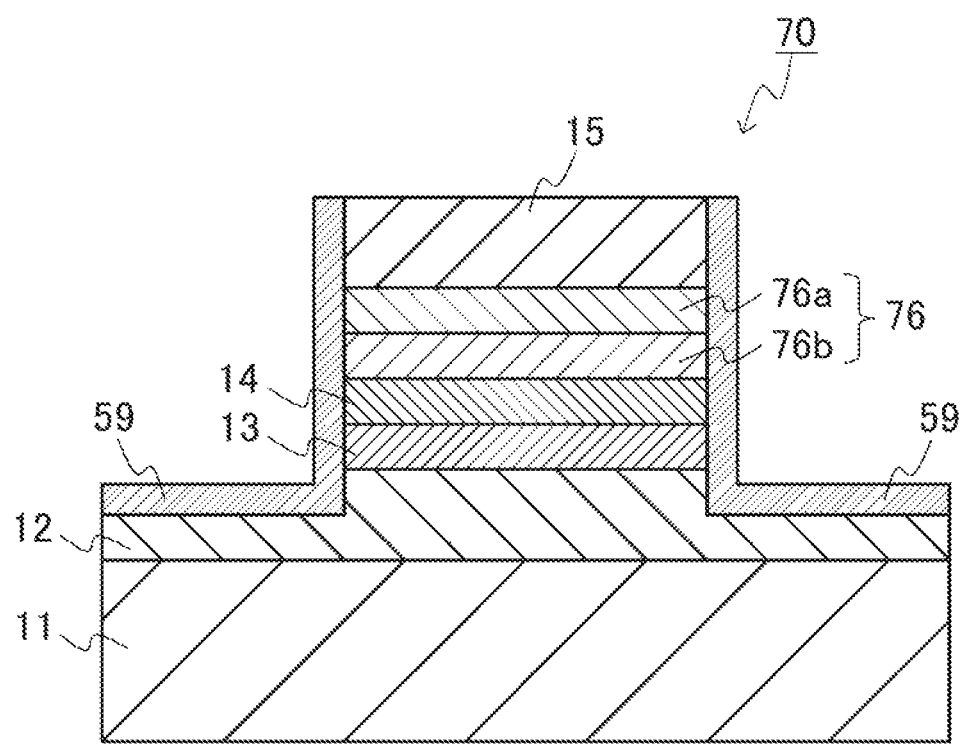
FIG. 7 is a cross sectional view showing yet another example of the configuration of the semiconductor optical modulator of the present invention in Embodiment 2.

In the semiconductor optical modulator of this Embodiment, for example, the electric field-relaxing layer may contain the n⁻-InP cladding layer at the second n-InP cladding layer side and contain the p⁻-InP cladding layer at the p-InP cladding layer side. FIG. 7 shows an example of the configuration of the semiconductor optical modulator of this Embodiment. In FIG. 7, identical parts to those shown in FIG. 5A are indicated with identical numerals and symbols. As shown in FIG. 7, in a semiconductor optical modulator 70, an electric field-relaxing layer 76 is interposed between the p-InP cladding layer 14 and the second n-InP cladding layer 15. In the electric field-relaxing layer 76, an n⁻-InP cladding layer 76a and a p⁻-InP cladding layer 76b are laminated such that the n⁻-InP cladding layer 76a is placed at the second n-InP cladding layer 15 side and the p⁻-InP cladding layer 76b is placed at the p-InP cladding layer 14 side. Except for these, the configuration of the semiconductor optical modulator 70 is the same as the configurations of the semiconductor optical modulators 50 and 60. In addition to the effects achieved by the semiconductor optical modulators of Embodiment 1, the semiconductor optical modulator 70 can obtain the effects similar to those achieved by the semiconductor optical modulators 50 and 60.

Embodiment 3

Figure 8A:
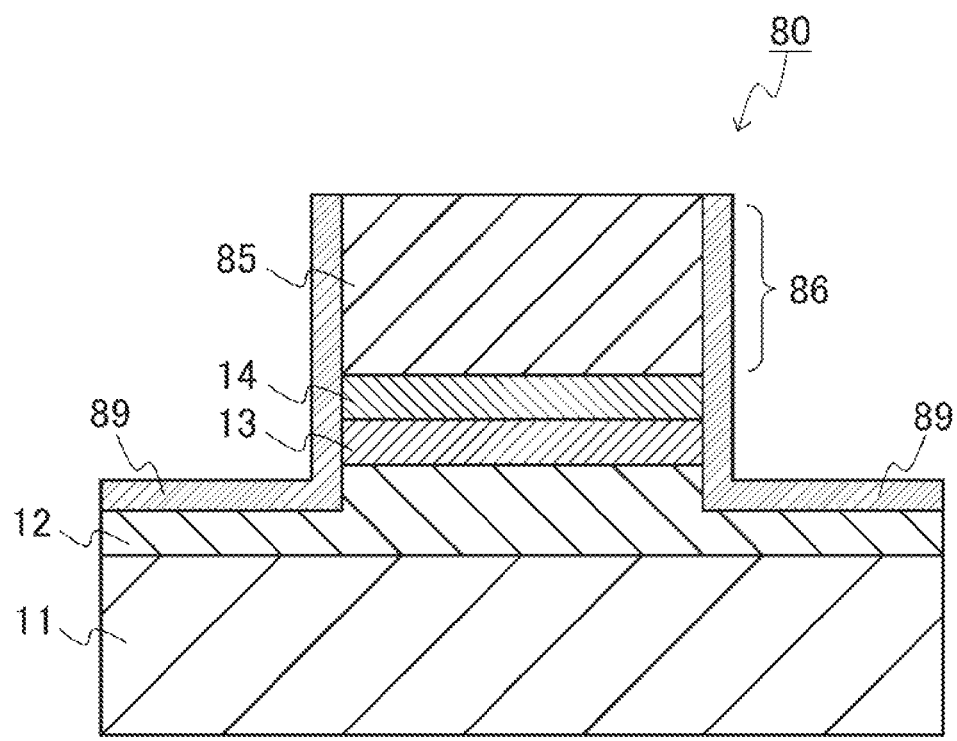
FIG. 8A is a cross sectional view showing an example of the configuration of the semiconductor optical modulator of the present invention in Embodiment 3.
Figure 8B:
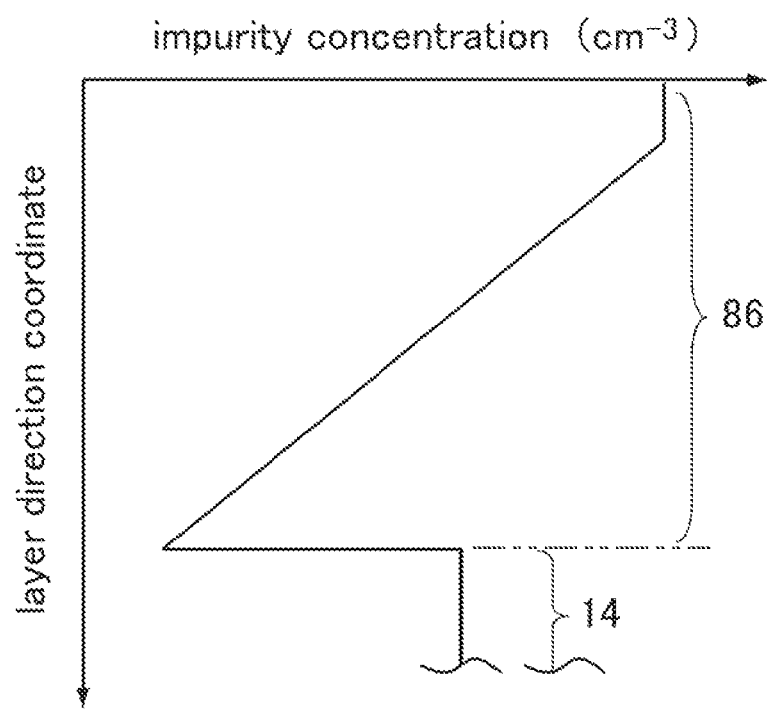
FIG. 8B is a graph showing an example of the relationship between the layer direction coordinate and the impurity concentration of the semiconductor optical modulator of the present invention in Embodiment 3.

FIG. 8A shows an example of the configuration of the semiconductor optical modulator of this Embodiment. The semiconductor optical modulator of this Embodiment includes an electric field-relaxing region at the interface part between the p-InP cladding layer and the second n-InP cladding layer instead of the electric field-relaxing layer, and the region of the second n-InP cladding layer containing the interface part is the electric field-relaxing region. In FIG. 8A, identical parts to those shown in FIG. 1 are indicated with identical numerals and symbols. As shown in FIG. 8A, in a semiconductor optical modulator 80, formed is a Highmesa waveguide structure in which a first n-InP cladding layer 12, an undoped layer (i layer) 13, a p-InP cladding layer 14, and a second n-InP cladding layer 85 are laminated on an InP substrate 11 in this order. A passivation film 89 is arranged at the side surfaces (right and left sides in FIG. 8A) of the waveguide structure. The region of the second n-InP cladding layer 85 containing the interface part is an electric field-relaxing region 86. As shown in FIG. 8B, the impurity concentration of the electric field-relaxing region 86 has a gradient that decreases toward the p-InP cladding layer 14. Further, at about the middle of the electric field-relaxing region 86, the impurity concentration thereof is lower than that of the p-InP cladding layer 14. Except for these, the configuration of the semiconductor optical modulator 80 is the same as the configurations of the semiconductor optical modulators of Embodiments 1 and 2. In FIG. 8B, identical parts to those shown in FIG. 8A are indicated with identical numerals and symbols. In addition to the effects achieved by the semiconductor optical modulators of Embodiment 1, the semiconductor optical modulator 80 can obtain the effects similar to those achieved by the semiconductor optical modulator 50.

In the semiconductor optical modulator of this Embodiment, almost all region of the second n-InP cladding layer including the interface part is an electric field-relaxing region. However, the present invention is not limited thereto, and is applicable as long as at least the region of the second n-InP cladding layer containing the interface part is an electric field-relaxing region, for example. In the semiconductor optical modulator of this Embodiment, the impurity concentration of the electric field-relaxing region linearly decreases relative to the layer direction coordinate. However, the present invention is not limited thereto. The impurity concentration may decrease in a stepwise manner, for example. In the semiconductor optical modulator of this Embodiment, the impurity concentration of the electric field-relaxing region is slightly lower than the impurity concentration of the p-InP cladding layer at about the middle of the electric field-relaxing region. However, the present invention is not limited thereto, and is applicable as long as the lowest value of the impurity concentration of the electric field-relaxing region becomes lower than the impurity concentration of the p-InP cladding layer, for example.

The semiconductor optical modulator of this Embodiment is produced in the same manner as the semiconductor optical modulators of Embodiments 1 and 2 except that the second n-InP cladding layer is formed such that the impurity concentration increases from the p-InP cladding layer side on the basis of the concentration gradient at the time of laminating the second n-InP cladding layer in lamination of each layer to the InP substrate by the MOVPE method, for example.

Figure 9A:
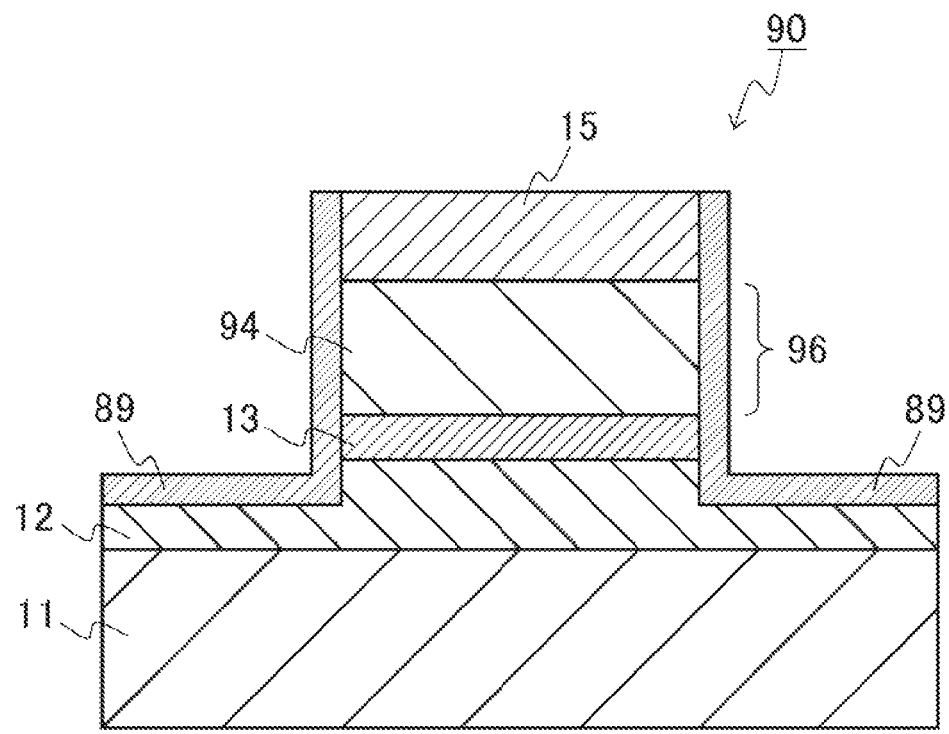
FIG. 9A is a cross sectional view showing another example of the configuration of the semiconductor optical modulator of the present invention in Embodiment 3.
Figure 9B:
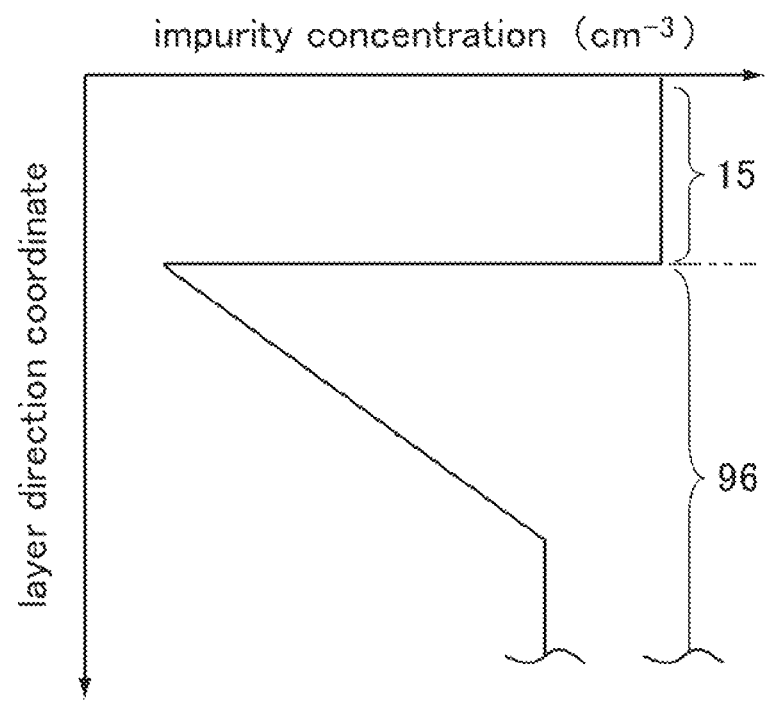
FIG. 9B is a graph showing another example of the relationship between the layer direction coordinate and the impurity concentration of the semiconductor optical modulator of the present invention in Embodiment 3.

In the semiconductor optical modulator of this Embodiment, the region of the p-InP cladding layer containing the interface part may be an electric field-relaxing region, for example. FIG. 9A shows an example of the configuration of this semiconductor optical modulator. In FIG. 9A, identical parts to those shown in FIG. 8A are indicated with identical numerals and symbols. As shown in FIG. 9A, in a semiconductor optical modulator 90, formed is a Highmesa waveguide structure in which a first n-InP cladding layer 12, an undoped layer (i layer) 13, a p-InP cladding layer 94, and a second n-InP cladding layer 15 are laminated on an InP substrate 11 this order. The region of the p-InP cladding layer 94 containing the interface part is an electric field-relaxing region 96. As shown in FIG. 9B, the impurity concentration of the electric field-relaxing region 96 has a gradient that decreases toward the second n-InP cladding layer 15. Except for these, the configuration of the semiconductor optical modulator 90 is the same as that of the semiconductor optical modulator 80. In FIG. 9B, identical parts to those shown in FIG. 9A are indicated with identical numerals and symbols. In addition to the effects achieved by the semiconductor optical modulators of Embodiment 1, the semiconductor optical modulator 90 can obtain the effects similar to those achieved by the semiconductor optical modulator 60.

Figure 10A:
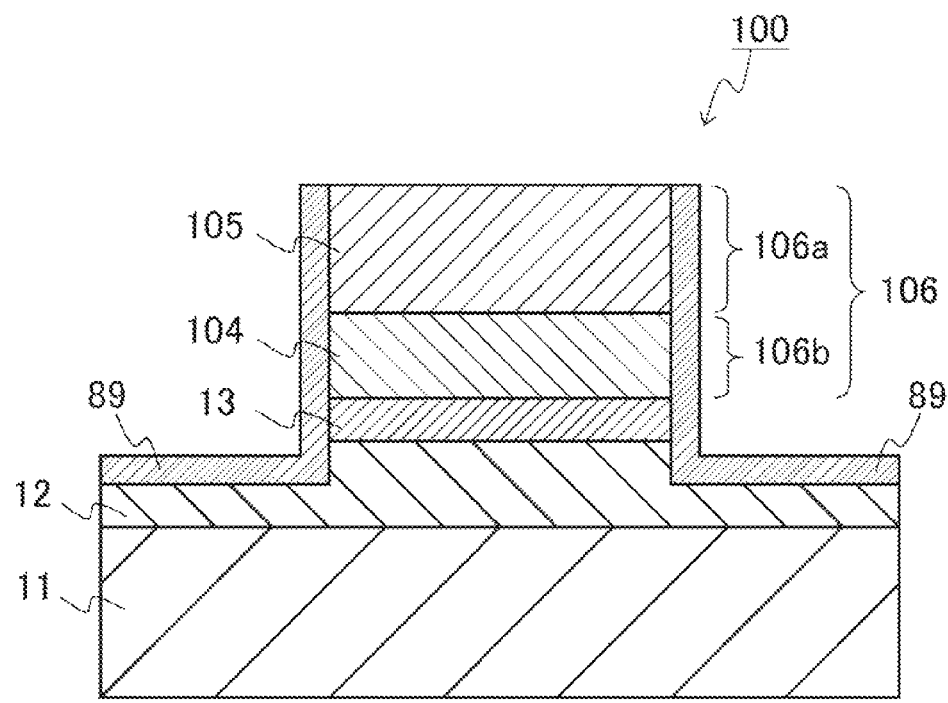
FIG. 10A is a cross sectional view showing yet another example of the configuration of the semiconductor optical modulator of the present invention in Embodiment 3.
Figure 10B:
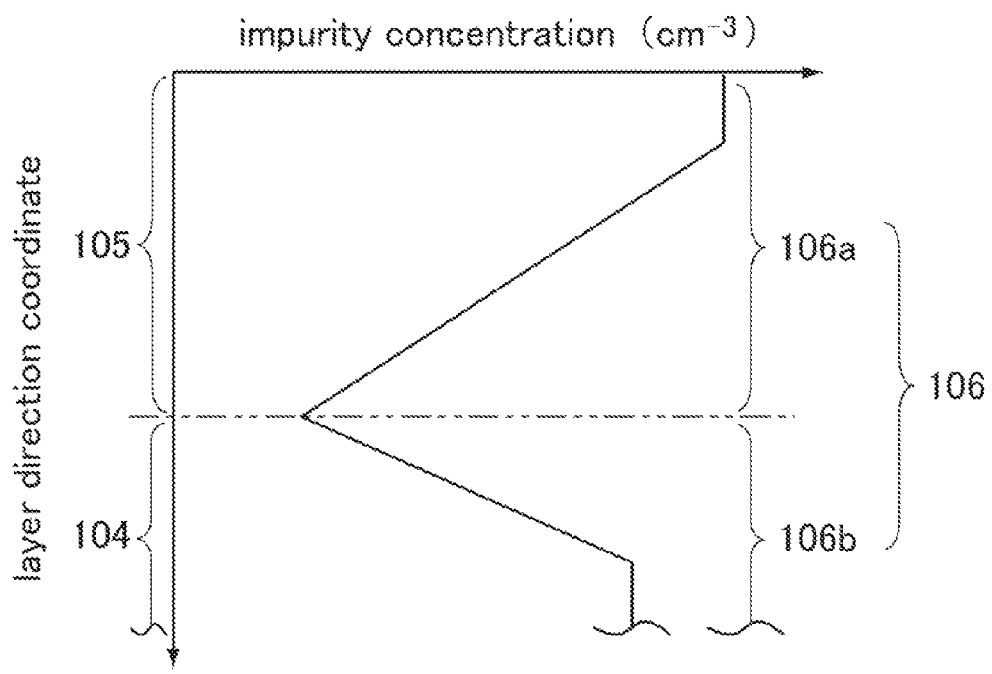
FIG. 10B is a graph showing yet another example of the relationship between the layer direction coordinate and the impurity concentration of the semiconductor optical modulator of the present invention in Embodiment 3.

In the semiconductor optical modulator of this Embodiment, the region of the second n-InP cladding layer containing the interface part and the region of the p-InP cladding layer containing the interface part may be an electric field-relaxing region, for example. FIG. 10A shows an example of the configuration of this semiconductor optical modulator. In FIG. 10A, identical parts to those shown in FIG. 8A are indicated with identical numerals and symbols. As shown in FIG. 10A, in a semiconductor optical modulator 100, formed is a Highmesa waveguide structure in which a first n-InP cladding layer 12, an undoped layer (i layer) 13, a p-InP cladding layer 104, and a second n-InP cladding layer 105 are laminated on an InP substrate 11 in this order. A region 106a of the second n-InP cladding layer 105 containing the interface part and a region 106b of the p-InP cladding layer 104 containing the interface part form an electric field-relaxing region 106. In the electric field-relaxing region 106, as shown in FIG. 10B, the impurity concentration of the region 106a has a gradient that decreases toward the p-InP cladding layer 104. On the other hand, the impurity concentration of the region 106b has a gradient that decreases toward the second n-InP cladding layer 105. Except for these, the configuration of the semiconductor optical modulator 100 is the same as that of the semiconductor optical modulator 80. In FIG. 10B, identical parts to those shown in FIG. 10A are indicated with identical numerals and symbols. In addition to the effects achieved by the semiconductor optical modulators of Embodiment 1, the semiconductor optical modulator 100 can obtain the effects similar to those achieved by the semiconductor optical modulators 50 and 60.

Embodiment 4

Figure 11:
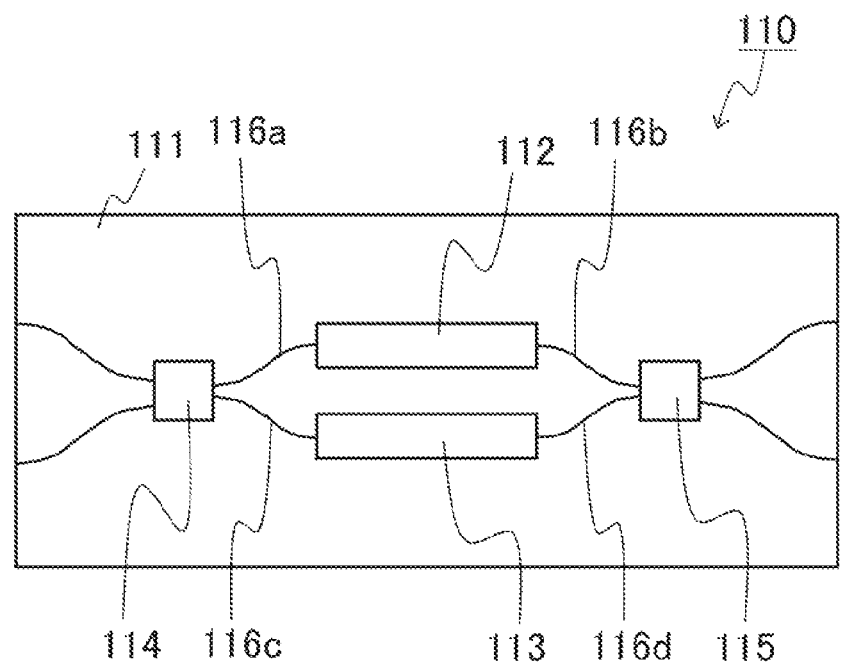
FIG. 11 is a schematic view showing an example of the configuration of the semiconductor Mach-Zehnder optical modulator of the present invention in Embodiment 4.
Figure 12:
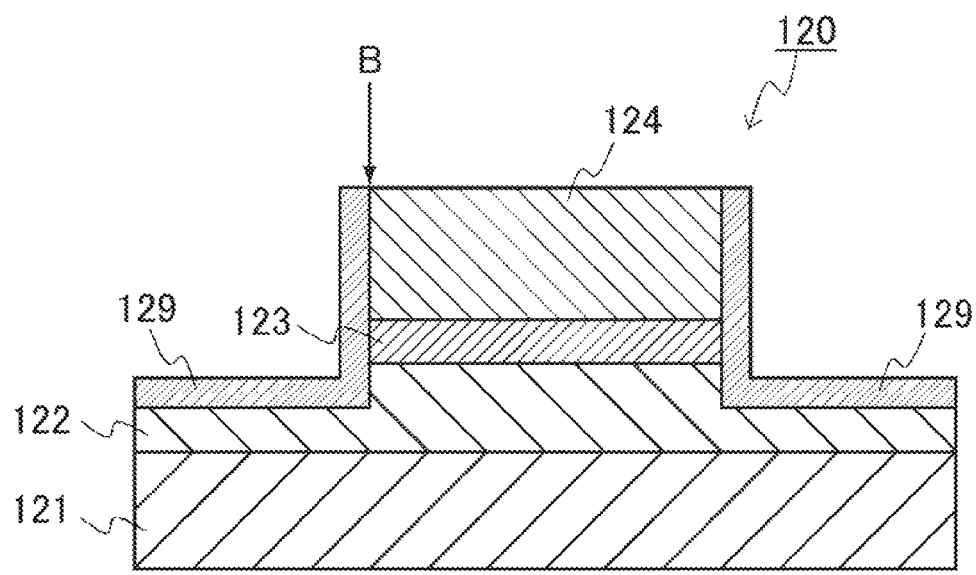
FIG. 12 is a cross sectional view showing an example of the configuration of a conventional semiconductor optical modulator.
Figure 13A:
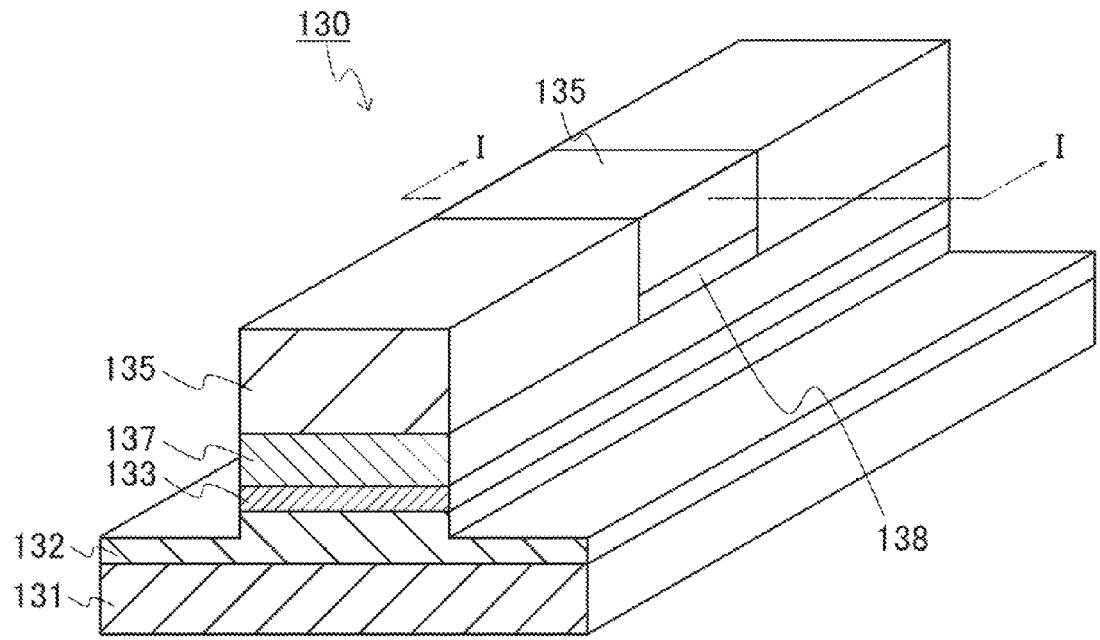
FIG. 13A is a perspective view showing another example of the configuration of a conventional semiconductor optical modulator.
Figure 13B:
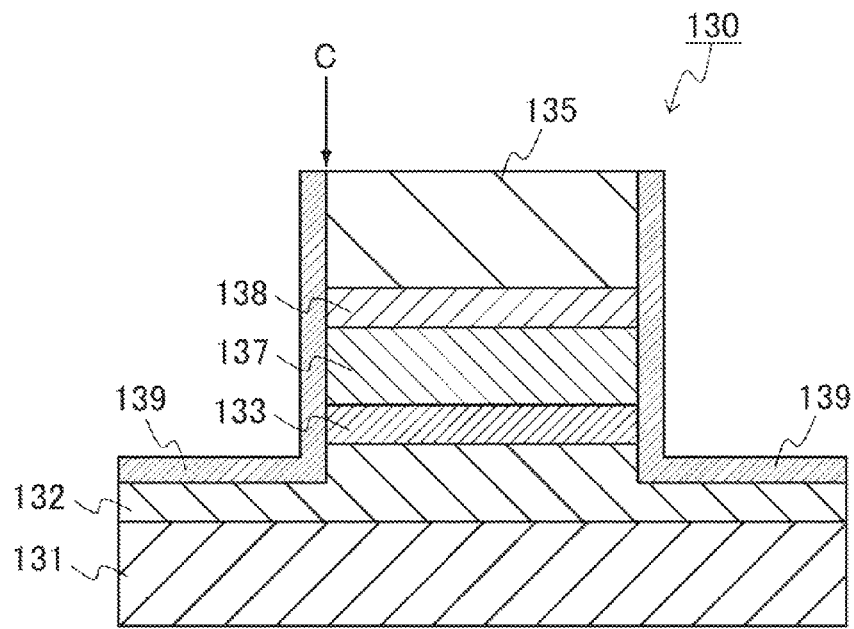
FIG. 13B is a cross sectional view taken along the line I-I of the semiconductor optical modulator shown in FIG. 13A.
Figure 14A:
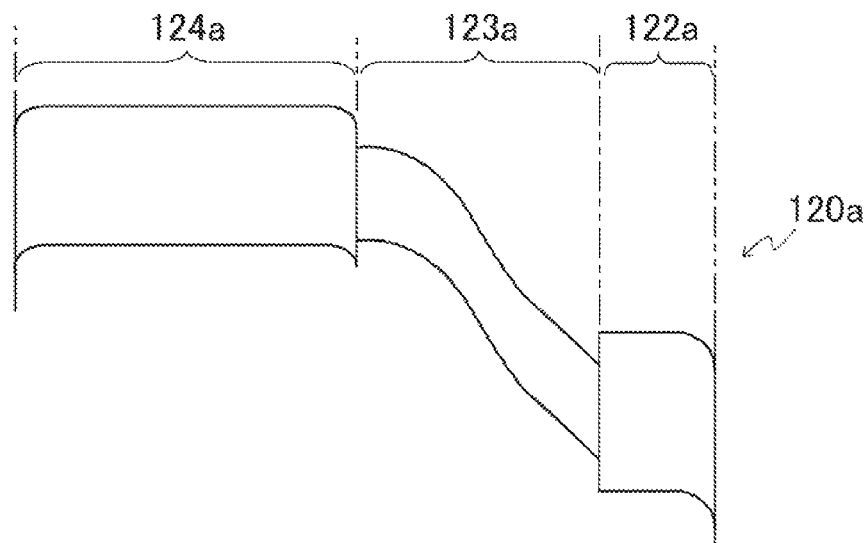
FIGS. 14A to C show band diagrams of the conventional semiconductor optical modulator.
Figure 14B:
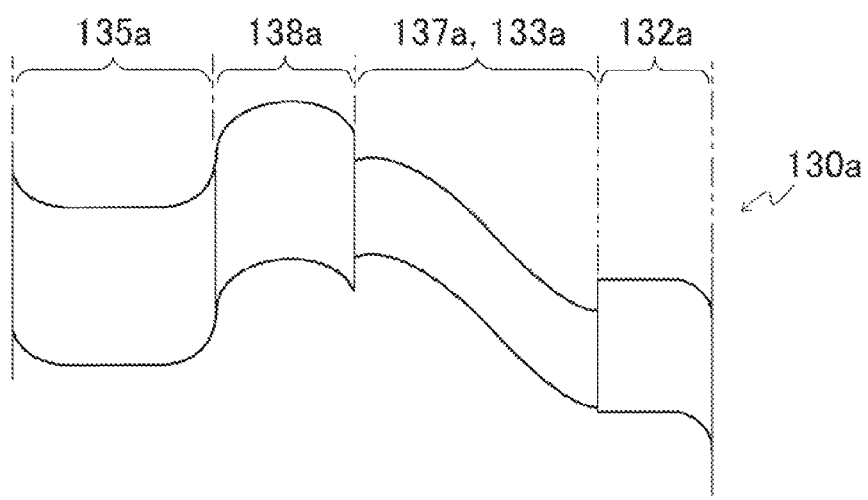
Figure 14C:
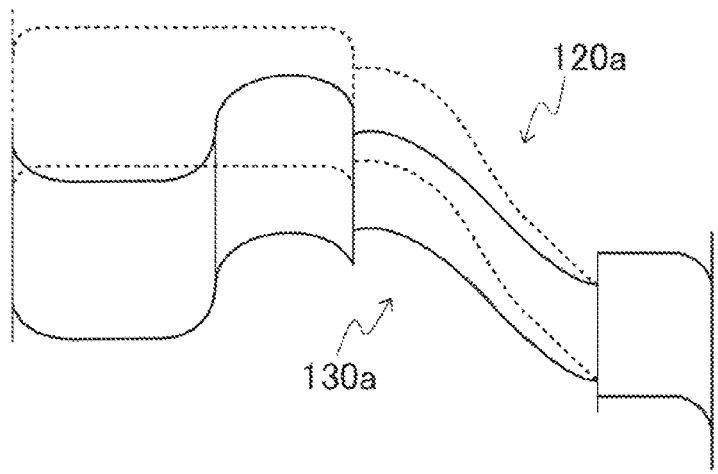
Figure 15:
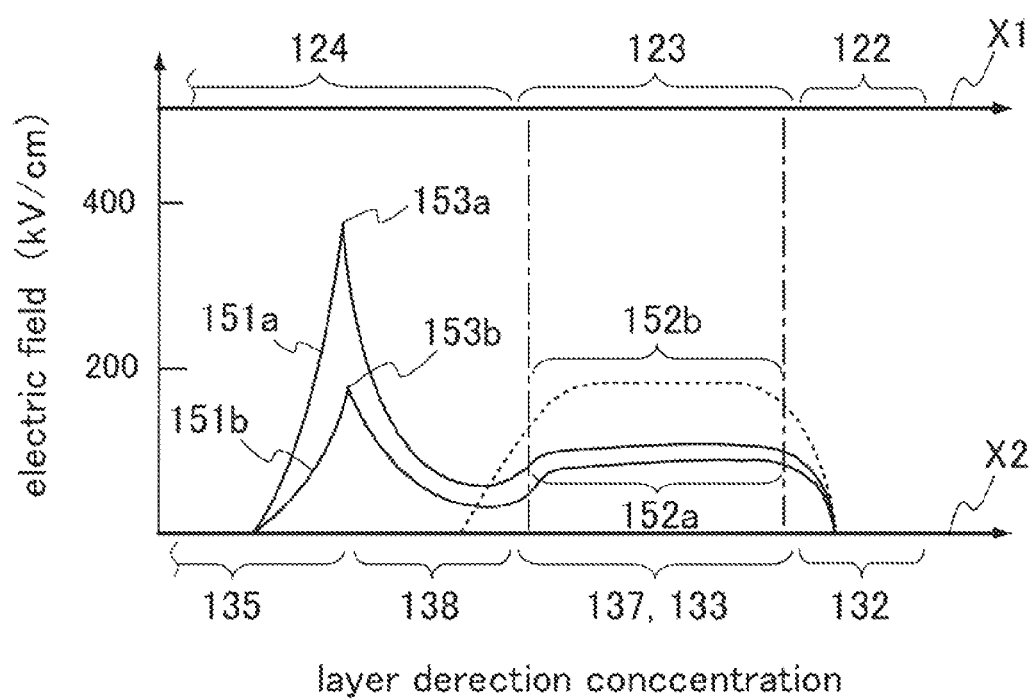
FIG. 15 is a graph showing an example of the relationship between the layer direction coordinate and the electric field of the conventional semiconductor optical modulator.

FIG. 11 shows an example of the configuration of the semiconductor Mach-Zehnder optical modulator of this Embodiment. As shown in FIG. 11, a semiconductor Mach-Zehnder optical modulator 110 includes a first phase modulation waveguide 112, a second phase modulation waveguide 113, and optical multiplexers 114 and 115 on a semiconductor substrate 111. At least one of the first phase modulation waveguide 112 and the second phase modulation waveguide 113 is the semiconductor optical modulator of the present invention. The first phase modulation waveguide 112 is connected to the optical multiplexer 114 via a waveguide 116a and is connected to the optical multiplexer 115 via a waveguide 116b. The second phase modulation waveguide 113 is connected to the optical multiplexer 114 via a waveguide 116c and is connected to the optical multiplexer 115 via a waveguide 116d. Upper electrodes are provided on the second n-type cladding layers of the first phase modulation waveguide 112 and the second phase modulation waveguide 113 (not shown). An electrode is provided on the first n-type cladding layer of the semiconductor substrate 111 (not shown). In the semiconductor Mach-Zehnder optical modulator of this Embodiment, a semiconductor substrate is employed as the substrate, a first phase modulation waveguide and a second phase modulation waveguide are employed as the first semiconductor optical modulator and the second semiconductor optical modulator, and an optical multiplexer is employed as the light branching unit and the light combining unit. Examples of the optical multiplexer include an MMI coupler, a directional coupler, and a Y branch waveguide. Examples of the upper electrode include a traveling-wave electrode and a lumped parameter electrode.

The semiconductor Mach-Zehnder optical modulator of this Embodiment is operated, for example, as follows. That is, first, when the optical multiplexer 114 receives an input light beam, the input light beam is branched and diverged into two light beams by the optical multiplexer 114. The diverged light beams are respectively introduced into the first phase modulation waveguide 112 and the second phase modulation waveguide 113. At this time, on the basis of the voltage applied to the first phase modulation waveguide 112 and the second phase modulation waveguide 113 by the upper electrodes and the electrode (not shown), the phase of each of the diverged light beams is modulated. Two modulated light beams are combined by the optical multiplexer 115 and the combined light beam is outputted from an output end of the optical multiplexer 115.

Since at least one of the first phase modulation waveguide 112 and the second phase modulation waveguide 113 of the semiconductor Mach-Zehnder optical modulator 110 of this Embodiment is the semiconductor optical modulator of the present invention, the optical transmission loss of the input light can be reduced as well as the electric field intensity to the optical modulation layer can be improved. Thereby, the semiconductor Mach-Zehnder optical modulator of this Embodiment achieves high efficiency. Further, since at least one of the first phase modulation waveguide 112 and the second phase modulation waveguide 113 of the semiconductor Mach-Zehnder optical modulator 110 of this Embodiment is the semiconductor optical modulator of the present invention, for example, the electric field applied to the boundary between the waveguide structure and the passivation film can be reduced and the breakdown of the passivation film can be prevented. Thereby, the semiconductor Mach-Zehnder optical modulator of this Embodiment achieves high reliability.

INDUSTRIAL APPLICABILITY

As described above, the semiconductor optical modulator and the semiconductor Mach-Zehnder optical modulator of the present invention achieve high efficiency and high reliability. Therefore, the semiconductor optical modulator and the semiconductor Mach-Zehnder optical modulator of the present invention can be applied, for example, to optical modulators of optical communication transmitters used for trunk systems, metro systems, and access systems. The use of the semiconductor optical modulator and the semiconductor Mach-Zehnder optical modulator of the present invention is not limited and they have a wide field of application.

The invention of the present application is described above with reference to the Embodiments. However, the invention of the present application is not limited to the above-described Embodiments. Various changes that can be understood by those skilled in the art can be made in the configurations and details of the invention within the scope of the invention of the present application.

This application claims priority from Japanese Patent Application No. 2009-128340 filed on May 27, 2009. The entire subject matter of the Japanese Patent Applications is incorporated herein by reference.

EXPLANATION OF REFERENCE NUMERALS 10, 40, 50, 60, 70, 80, 90, and 100 semiconductor optical modulator
10a, 50a, and 60a band diagram of semiconductor optical modulator
11 InP substrate (substrate)
12 and 42 first n-InP cladding layer (first n-type cladding layer)
12a band diagram of first n-InP cladding layer
13 and 43 undoped layer having multiple quantum well structure (i layer: semiconductor optical modulation layer)
13a band diagram of undoped layer (i layer)
14, 94, and 104 p-InP cladding layer (p-type cladding layer)
14a band diagram of p-InP cladding layer
15, 85, and 105 second n-InP cladding layer (second n-type cladding layer)
15a band diagram of second n-InP cladding layer
16 electric field-relaxing layer
16a band diagram of electric field-relaxing layer
19, 49, 59, and 89 passivation (insulation protection) film
31 electric field applied to semiconductor optical modulation layer
32 electric field applied between p-InP cladding layer and second n-InP cladding layer (electric field-relaxing layer)
56 electric field-relaxing layer (n$^-$-InP cladding layer)
56a band diagram of n$^-$-InP cladding layer
66 electric field-relaxing layer (p$^-$-InP cladding layer)
66a band diagram of p$^-$-InP cladding layer
76 electric field-relaxing layer
76a n$^-$-InP cladding layer
76b p$^-$-InP cladding layer
86, 96, and 106 electric field-relaxing region 106a region of second n-InP cladding layer containing interface part
106b region of p-InP cladding layer containing interface part
110 semiconductor Mach-Zehnder optical modulator
111 semiconductor substrate (substrate)
112 first phase modulation waveguide (first semiconductor optical modulator)
113 second phase modulation waveguide (second semiconductor optical modulator)
114 optical multiplexer (light branching unit)
115 optical multiplexer (light combining unit)
116a, 116b, 116c, and 116d waveguide
120 and 130 conventional semiconductor optical modulator
120a and 130a band diagram of conventional semiconductor optical modulator
121 and 131 substrate
122 n-type semiconductor layer
122a band diagram of n-type semiconductor layer
123 optical modulation layer (undoped layer (i layer))
123a band diagram of optical modulation layer (undoped layer (i layer))
124 p-type semiconductor layer
124a band diagram of p-type semiconductor layer
129 passivation (insulation protection) film
132 first n-InP cladding layer
132a band diagram of first n-InP cladding layer
133 optical modulation layer (i layer)
133a band diagram of optical modulation layer (i layer)
135 second n-InP cladding layer
135a band diagram of second n-InP cladding layer
137 SI cladding layer
137a band diagram of SI cladding layer
138 p-type semiconductor region
138a band diagram of p-type semiconductor region
139 passivation (insulation protection) film
151a and 151b graph of electric field
152a and 152b electric field applied to optical modulation layer
153a and 153b peak electric field
A, B, and C arrow
X1 and X2 layer direction coordinate

The invention claimed is:

1. A semiconductor optical modulator comprising:
a substrate;
a first n-type cladding layer;
a semiconductor optical modulation layer;
a p-type cladding layer;
a second n-type cladding layer;
a passivation film; and
an electric field-relaxing layer, wherein
the first n-type cladding layer, the semiconductor optical modulation layer, the p-type cladding layer, and the second n-type cladding layer are laminated on the substrate in this order to form a waveguide structure,
the passivation film is arranged at side surfaces of the waveguide structure, the electric field-relaxing layer is interposed between the p-type cladding layer and the second n-type cladding layer, and
an impurity concentration of the electric field-relaxing layer is lower than that of the p-type cladding layer and that of the second n-type cladding layer.

2. The semiconductor optical modulator according to claim 1, wherein the impurity concentration of the electric field-relaxing layer is $1 \times 10^{15}$ to $2 \times 10^{17}$ cm$^{-3}$.

3. The semiconductor optical modulator according to claim 1, wherein the electric field-relaxing layer is an n-type semiconductor layer or a p-type semiconductor layer having an impurity concentration lower than that of the p-type cladding layer and that of the second n-type cladding layer.

4. The semiconductor optical modulator according to claim 1, wherein
a second n-type cladding layer side of the electric field-relaxing layer is an n-type semiconductor layer having an impurity concentration lower than that of the p-type cladding layer and that of the second n-type cladding layer, and
a p-type cladding layer side of the electric field-relaxing layer is a p-type semiconductor layer having an impurity concentration lower than that of the p-type cladding layer and that of the second n-type cladding layer.

5. The semiconductor optical modulator according to claim 1, comprising:
an electric field-relaxing region at an interface part between the p-type cladding layer and the second n-type cladding layer instead of the electric field-relaxing layer, wherein
an impurity concentration of the electric field-relaxing region is lower than a highest value of the impurity concentration of the p-type cladding layer and a highest value of the impurity concentration of the second n-type cladding layer.

6. The semiconductor optical modulator according to claim 5, wherein the impurity concentration of the electric field-relaxing region in the second n-type cladding layer has a gradient that decreases toward the p-type cladding layer, and a lowest value thereof is lower than the impurity concentration of the p-type cladding layer.

7. The semiconductor optical modulator according to claim 5, wherein the impurity concentration of the electric field-relaxing region in the p-type cladding layer has a gradient that decreases toward the second n-type cladding layer, and a lowest value thereof is lower than the impurity concentration of the n-type cladding layer.

8. The semiconductor optical modulator according to claim 5, wherein the impurity concentration of the electric field-relaxing region in the second n-type cladding layer has a gradient that decreases toward the p-type cladding layer, and a lowest value thereof is lower than the impurity concentration of the p-type cladding layer, and
the impurity concentration of the electric field-relaxing region in the p-type cladding layer has a gradient that decreases toward the second n-type cladding layer, and a lowest value thereof is lower than the impurity concentration of the n-type cladding layer.

9. The semiconductor optical modulator according to claim 1, wherein
the waveguide structure is a Highmesa waveguide structure or a ridge waveguide structure.

10. A semiconductor Mach-Zehnder optical modulator comprising:
a substrate;
a light branching unit branching input light;
a first semiconductor optical modulator modulating light branched;
a second semiconductor optical modulator modulating light branched; and
a light combining unit combining light modulated by the first semiconductor optical modulator and the second semiconductor optical modulator, wherein
the light branching unit, the first semiconductor optical modulator, the second semiconductor optical modulator, and the light combining unit are provided on the substrate, and at least one of the first semiconductor optical modulator and the second semiconductor optical modulator is the semiconductor optical modulator according to claim 1.

11. The semiconductor Mach-Zehnder optical modulator according to claim 10, further comprising:

an upper electrode, wherein the upper electrode is a traveling-wave electrode.

* * * * *